(12) United States Patent
Miyaki

(10) Patent No.: US 7,132,197 B2
(45) Date of Patent: Nov. 7, 2006

(54) BATTERY

(75) Inventor: Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 10/409,336

(22) Filed: Apr. 7, 2003

(65) Prior Publication Data

US 2003/0215717 A1  Nov. 20, 2003

(30) Foreign Application Priority Data

Apr. 11, 2002  (JP) .............................. 2002-109652

(51) Int. Cl.
 *H01M 4/58* (2006.01)
(52) U.S. Cl. .................. 429/218.1; 429/224; 429/221; 429/223; 429/220; 429/229; 429/231.5; 429/231.1; 429/231.3; 429/232
(58) Field of Classification Search ............... 429/232, 429/224, 231.95, 223, 231.1, 231.3, 221, 429/218.1, 220, 229, 231.5
See application file for complete search history.

(56) References Cited

U.S. PATENT DOCUMENTS

2003/0099884 A1 *  5/2003  Chiang et al. .............. 429/233

FOREIGN PATENT DOCUMENTS

| JP | 9-92277 | 4/1997 |
|---|---|---|
| JP | 10-223221 | 8/1998 |
| JP | 1999-242954 | 9/1999 |
| JP | 2000-173593 | 6/2000 |
| JP | 2001-118575 | 4/2001 |
| WO | WO2002/093412 | 3/2002 |

* cited by examiner

*Primary Examiner*—Laura Weiner
(74) *Attorney, Agent, or Firm*—Sonnenschein Nath & Rosenthal LLP

(57) ABSTRACT

Provided is a battery with a higher capacity, a superior charge-discharge cycle characteristic and a superior load characteristic. A cathode and an anode with a separator in between are spirally wound. The cathode comprises a cathode mixed layer containing a composite oxide including Li and at least one kind selected from the group consisting of Co, Ni, Mn and Fe. The anode comprises an anode mixed layer including tin-containing alloy powders and a carbon material. The tin-containing alloy powders are made of tin and an element except for alkali metal before first charge. A porosity of the anode mixed layer before the first charge is within a range from 25 vol % to 65 vol % inclusive. Thereby, even if a tin-containing alloy expands, enough pores as lithium-ion paths can be secured. Therefore, a superior charge-discharge cycle characteristic and a superior high load characteristic can be obtained.

6 Claims, 1 Drawing Sheet

BATTERY

RELATED APPLICATION DATA

The present application claims priority to Japanese Application(s) No(s). P2002-109652 filed Apr. 11, 2002, which application(s) is/are incorporated herein by reference to the extent permitted by law.

BACKGROUND OF THE INVENTION

1. Field of the Invention

The present invention relates to a battery comprising a cathode, an anode including tin-containing alloy powders, and an electrolyte.

2. Description of the Related Art

A large number of small-sized portable electronic devices such as camera/VTR (video tape recorder) combination systems, cellular phones, laptop computers or the like have come into widespread in accordance with recent advances in electronics, and a development for reducing their sizes and weights has proceeded. Accordingly, a development in compact and lightweight batteries having a high energy density, specifically secondary batteries as portable power sources used in the portable electronic devices has proceeded. As such a secondary battery, for example, a battery which uses a graphite material using intercalation reaction of lithium ions into graphite layers, or a carbon material using an application of insertion/extraction reaction of lithium ions into/from pores as an anode material have been developed and have been in practical use.

However, in accordance with a recent increase in performance of portable devices, a demand for capacity has been growing, so the battery is required to have a characteristic in which no decline in capacity occurs in spite of repeated cycles of charge and discharge, that is, an excellent charge-discharge cycle characteristic. Moreover, in accordance with diversification of use conditions of the devices, a demand for a battery exhibiting an excellent capacity at high load has been growing. As a method of obtaining such characteristics, it can be considered that light metal such as lithium metal or the like is used as is as an anode material. However, in this case, in a charging process, the light metal in dendrite form is likely to be deposited on an anode, and a current density becomes extremely high at a tip of a dendrite, so a charge-discharge cycle characteristic may decline due to the decomposition of an electrolyte or the like, or when the dendrite excessively grows to reach a cathode, an internal short circuit may be induced.

In order to inhibit the deposition of lithium in dendrite form, it is considered that a specific alloy is used as an anode active material, and during charge, lithium deposited on a surface of the anode is alloyed with a base metal of an alloy of the anode active material to be introduced into the alloy. As such an alloy, lithium-lead (Pb) alloy (for example, refer to Japanese Examined Patent Application Publication No. Hei 3-53743, Hei 5-34787, Hei 7-73044 and Hei 8-138654) or a bismuth (Bi)-tin (Sn)-lead-cadmium (Cd) alloy (for example, refer to Japanese Examined Patent Application Publication No. Hei 4-47431 and Hei 3-64987) have been disclosed, however, lead, bismuth and cadmium are not preferable in the viewpoint of recent environmental protection.

Moreover, although a method using a silicon (Si) alloy which causes very little damage to the environment has been proposed (refer to Japanese Unexamined Patent Application Publication No. Hei 7-302588, Hei 10-199524, Hei 7-326342, Hei 10-255768 and Hei 10-302770), the reaction between the silicon alloy and an organic solvent is so large that the charge-discharge cycle characteristic is poor, so it could not be put to practical use.

Further, a method using tin or a tin-containing alloy has been proposed. As the tin-containing alloy, for example, alloy materials of tin and nickel (Ni) (refer to Japanese Examined Patent Application Publication No. Hei 4-12586, Japanese Unexamined Patent Application Publication No. Hei 10-162823 and Sho 10-308207), alloy materials of lithium, aluminum (Al) and tin (refer to Japanese Unexamined Patent Application Publication No. Sho 61-66369), alloy materials of tin and zinc (Zn) (refer to Japanese Unexamined Patent Application Publication No. Sho 62-145650), materials of a tin alloy containing 1 wt % to 55 wt % of phosphorus (P) (refer to Japanese Unexamined Patent Application Publication No. Hei 8-273602), $Cu_2NiSn$ and $Mg_2Sn$ (refer to Japanese Unexamined Patent Application Publication No. Hei 10-223221), alloy materials of tin and copper (Cu) (refer to Japanese Unexamined Patent Application Publication No. Sho 10-308207), materials of a mixture of a tin-containing phase which absorbs lithium, and a phase made of manganese (Mn), iron (Fe), cobalt (Co), nickel and copper which does not absorb lithium (refer to Japanese Unexamined Patent Application Publication No. Hei 11-86854) have been disclosed.

However, in the case of a battery using tin or a tin-containing alloy, a problem that the battery cannot fully satisfy requirements for the capacity, the charge-discharge cycle characteristic and a load characteristic arises. As a cause of the problem, it is considered that when the materials absorb lithium, the materials expand. For example, it is known that in an alloy containing pure tin and lithium at a ratio of 1:4.4, the pure tin expands approximately 3.6 times, and when the tin-containing alloy absorbs lithium, it expands (refer to Electrochimica Acta 45(1999)31). In the case of using a conventional graphite material, expansion of the anode occurs, however, compared to an expansion coefficient of the material, an expansion coefficient in the case of using tin is much larger. Compared to tin, an expansion coefficient of the tin-containing alloy can be greatly improved (refer to Journal of the Electrochemical Society 148(5)A471(2001)), but it cannot satisfy requirements for practical use.

Further, according to Japanese Unexamined Patent Application Publication No. Hei 6-187971, in order to improve the charge-discharge cycle characteristic, a secondary battery using an anode made of alloy powders containing lithium with a porosity of 20% to 35% has been disclosed, although, an average voltage and a capacity of the battery is so low that the battery cannot obtain a necessary capacity for use especially in portable devices.

SUMMARY OF THE INVENTION

In view of the foregoing, it is an object of the present invention to provide a battery capable of improving a battery capacity, a charge-discharge cycle characteristic and a capacity at high load.

A battery according to the invention comprises a cathode, an anode and an electrolyte, wherein the anode comprises an anode mixed layer including tin-containing alloy powders, and the tin-containing alloy powders are made of tin and an element except for alkali metal before first charge, and a porosity of the anode mixed layer before the first charge is within a range from 25 vol % to 65 vol % inclusive.

In the battery according to the invention, the tin-containing alloy powders made of tin and an element except for alkali metal are used, so a higher battery capacity can be obtained. Further, the porosity of the anode mixed layer before the first charge is within a range from 25 vol % to 65 vol % inclusive, so a superior charge-discharge cycle characteristic can be obtained, and a capacity at high load can be improved.

Other and further objects, features and advantages of the invention will appear more fully from the following description.

DETAILED DESCRIPTION OF THE PREFERRED EMBODIMENTS

Figure 1:
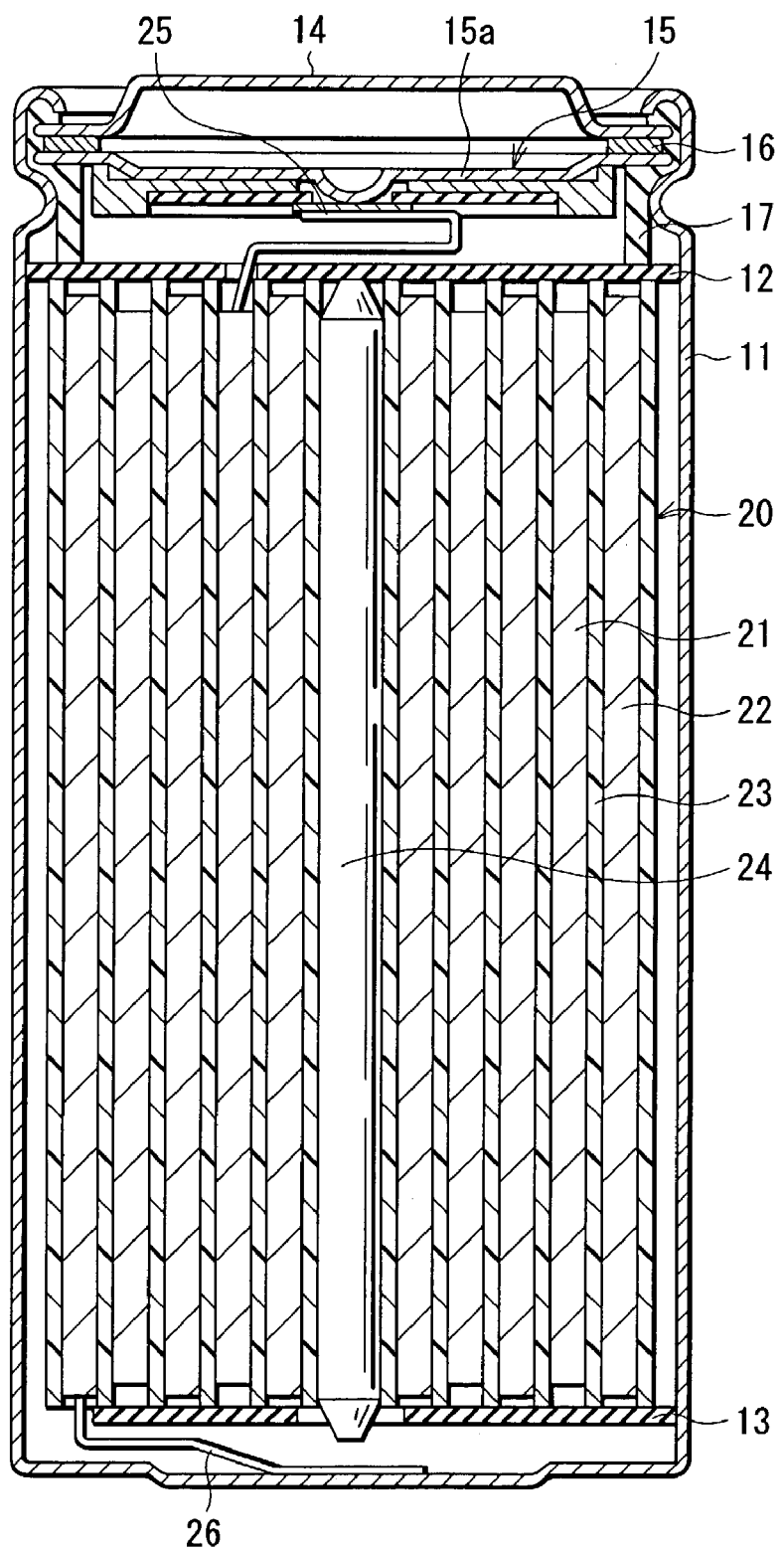
FIG. 1 is a sectional view showing a structure of a secondary battery according to an embodiment of the invention.

A preferred embodiment of the present invention will be described in more detail below referring to the accompanying drawing.

FIG. 1 shows a sectional view of a structure of a secondary battery according to an embodiment of the invention, but the invention is not limited to the embodiment. The secondary battery is a so-called cylindrical battery, and comprises a spirally wound electrode body 20 including a strip-shaped cathode 21 and a strip-shaped anode 22 spirally wound with a separator 23 in between in a hollow cylindrical-shaped battery can 11. The battery can 11 is made of, for example, nickel-plated iron. An end portion of the battery can 11 is closed, and the other end portion thereof is opened. In the battery can 11, a pair of insulating plates 12 and 13 are disposed so that the spirally wound electrode body 20 is sandwiched therebetween in a direction perpendicular to a spirally wound peripheral surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15a becomes deformed so as to disconnect the electrical connection between the battery cover 14 and the spirally wound electrode body 20. When a temperature rises, the PTC device 16 limits current flow by an increased resistance, thereby resulting in preventing abnormal heat generation by a large current. The gasket 17 is made of, for example, an insulating material, and its surface is coated with asphalt.

The spirally wound electrode body 20 is wound around, for example, a center pin 24. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

The cathode 21 includes, for example, a cathode mixed layer and a cathode current collector layer, and has a structure in which the cathode mixed layer is disposed on either side or both sides of the cathode current collector layer. The cathode current collector layer is made of, for example, aluminum foil. The cathode mixed layer includes a cathode material capable of inserting and extracting lithium as a cathode active material and, if necessary, an electronic conductor such as graphite, a binder such as polyvinylidene fluoride and a conventionally known additive.

As the cathode material capable of inserting and extracting lithium, a composite oxide including lithium, a first element of at least one kind selected from the group consisting of cobalt, nickel, manganese and iron, and oxygen (O) is preferable. The composite oxide may further include a second element of at least one kind selected from the group consisting of elements of alkali metal (in Group 1 (IA) of the periodic table) except for lithium, aluminum, gallium (Ga), indium (In), germanium (Ge), tin, lead, antimony (Sb), bismuth, silicon, phosphorus and boron (B). The content of the second element is preferably within a range from 0 mol % to 30 mol % inclusive at a mole ratio to the first element. As preferable composite oxides, $LiCoO_2$, $LiNiO_2$, $LiN-i_xCo_{1-x}O_2$ (0.2<x<1), $LiNi_xCo_yMn_{1-x-y}O_2$ (0.1<x, y<1), $LiMn_2O_4$, $LiFePO_4$, $LiMn_xFe_{1-x}PO_4$ (0<x<0.65), $LiCoPO_4$ and so on are cited. As the cathode active material, one kind of the composite oxides or a mixture of two or more kinds of the composite oxides may be used.

The anode 22 has, for example, a structure in which an anode mixed layer is disposed on either side or both sides of an anode current collector layer as in the case of the cathode 21. The anode current collector layer is made of, for example, metal foil such as copper foil, nickel foil, stainless foil or the like. The anode mixed layer includes an anode material capable of inserting and extracting lithium as an anode active material and, if necessary, an electronic conductor or a binder.

More specifically, in the secondary battery, as the anode material capable of inserting and extracting lithium, tin-containing alloy powers are included. The tin-containing alloy powders are made of tin and a third element except for alkali metal before first charge. The content of the third element in the tin-containing alloy powders is preferably within a range from 10 wt % to 70 wt % inclusive, because a high capacity can be obtained within the range. As the third element, at least one kind selected from the group consisting of chromium (Cr), manganese, iron, cobalt, nickel, copper, zinc and molybdenum (Mo) is preferably included, and more preferably, at least one kind selected from the group consisting of cobalt, iron, copper and nickel is included.

The average particle size of primary particles of the tin-containing alloy powders is preferably within a range from 0.1 μm to 35 μm inclusive, and more preferably, within a range from 0.1 μm to 25 μm inclusive. Further, in the tin-containing alloy powders, secondary particles may be formed by agglomerating the primary particles. In this case, the average particle size of the primary particles is preferably within a range from 0.1 μm to 20 μm inclusive, and the average particle size of the secondary particles is preferably within from 10 μm to 40 μm inclusive. When the particle size is smaller than the range, an undesired reaction between surfaces of the particles and an electrolyte which will be described later becomes more pronounced, and thereby the capacity and charge-discharge efficiency will decline. On the other hand, when the particle size is larger than the range, a lithium ion insertion/extraction reaction is difficult to proceed in the alloy particles, thereby the capacity will decline. In order to obtain a desired particle size, it is preferable that in a manufacturing process, the tin-containing alloy powders are classified before preparing an anode mixture which will be described later. As a method of classifying the powders, for example, dry classification such as screening, air classifier or the like and wet classification such as centrifugal setting machine are cited, and it is preferable to choose from the methods depending upon an amount of particles to be processed or a particle size. Further, as a method of measuring the particle size, observation by an optical microscope or an electron microscope, laser diffraction, or the like is cited, and it is preferable to choose from the methods depending upon a range of particle size.

The crystallinity of the tin-containing alloy powders may be crystalline or amorphous. Specifically, an amorphous or microcrystalline aggregate is preferable. In the amorphous or microcrystalline aggregate, a half-width of the peak of a diffraction pattern obtained by X-ray diffraction using a CuK$\alpha$ ray is 0.5° or over at 2$\theta$, and a pattern is as broad as from 30° to 60° at 2$\theta$.

Moreover, for the purpose of inhibiting a side reaction with the electrolyte, improving stability of handling the tin-containing alloy powders, or the like, the surfaces of the tin-containing alloy powers may be coated with another compound such as, for example, an oxide, an organic substance or an inorganic substance.

As a method of manufacturing the tin-containing alloy powders, a conventional method used for powder metallurgy or the like can be widely used. For example, there are a method in which a raw material is melted and cooled by a melting furnace such as an arc melting furnace, a high-frequency induction furnace or the like, and then is pulverized, a method of obtaining alloy powders through rapidly quenching molten metal such as a single-roll quenching method, a two-roll quenching method, a gas atomization method, a water atomization method, a centrifugal atomization method or the like, and a method of obtaining alloy powders through consolidating molten metal by a cooling method such as the single-roll quenching method, the two-roll quenching method or the like, and then pulverizing the metal by a suitable method such as a mechanical alloying method or the like. Specifically, the gas atomization method and the mechanical alloying method are preferably but not exclusively used. Further, in order to prevent oxidation by oxygen in air, these synthesis and pulverization are preferably carried out in an atmosphere of an inert gas such as argon (Ar), nitrogen (N), helium (He) or the like or in a vacuum.

As the electronic conductor of the anode mixed layer, a carbon material is preferable, because the electrical conductivity of the anode 22 as well as the impregnation of the electrolyte which will be described later can be improved. Among carbon materials, a material capable of inserting and extracting lithium, that is, the material also having a function as the anode active material is preferable, because when the anode comprise only the tin-containing alloy, a voltage relative to lithium metal is higher and a battery voltage becomes lower, however, in the carbon material, a voltage relative to lithium metal is lower, so the battery voltage becomes higher by mixing the carbon material.

As such a carbon material, for example, natural graphite (scaly graphite, flake graphite, amorphous graphite or the like), artificial graphite, non-graphitizable carbon, kinds of coke, kinds of graphite, kinds of glass-like carbon, an organic high polymer fired body, a carbon fiber, activated carbon and kinds of carbon black (fine-grain carbon such as acetylene black, ketjen black or the like) are cited. Among them, kinds of coke include pitch coke, needle coke, petroleum coke and so on, and the organic high molecular weight sintered body is a high molecular weight material such as a phenolic resin, a furan resin or the like which is carbonized through firing at a suitable temperature. The content of the carbon material in the anode mixed layer is preferably within a range from 5 wt % to 85 wt % inclusive, and more preferably within a range from 8 wt % to 70 wt % inclusive. When the content is less than the range, the penetration of the electrolyte into the anode declines, thereby resulting in a decline in the capacity, and when the content is more than the range, a ratio of the tin-containing alloy powders becomes too low, thereby resulting in a decline in the capacity.

The anode mixed layer may include an electrically conductive polymer such as, for example, polyacetylene, polypyrrole or the like as the electronic conductor.

The binder in the anode mixed layer is made of, for example, one kind or a mixture of two or more kinds selected from high polymers such as polyvinylidene fluoride, polyethylene, fluoro rubber, ethylene-propylene-diene terpolymer (EPDM), polyvinylpyrrolidone, styrene butadiene rubber, polybutadiene or the like, and the binder is preferably but not exclusively made of one kind or a mixture of two or more kinds selected from styrene butadiene rubber, polyvinylidene fluoride and polyethylene. The content of the binder in the anode mixed layer is preferably within a range from 1 wt % to 30 wt %, and more preferably within a range from 2 wt % to 15 wt %.

Moreover, the anode mixed layer preferably has a porosity of 25 vol % to 65 vol % inclusive before the first charge, and more preferably a porosity of 30 vol % to 50 vol % inclusive. When the porosity before the first charge is less than the range, a space to be filled with the electrolyte which functions as a lithium ion path is reduced, so lithium ions are not sufficiently supplied to the anode active material in the anode mixed layer. Further, when the porosity is larger than the range, an amount of the anode active material filled in the battery is reduced, thereby the battery capacity declines, so a function as a battery cannot be served. It has been pointed out before that the tin-containing alloy expands when inserting lithium during charge, however, in the secondary battery, enough pores in the anode 22 before charge are secured, so enough pores for lithium ion conduction can be secured even if the alloy expands during charge.

In this specification, the porosity of the anode mixed layer before the first charge means a porosity measured after manufacturing the anode mixed layer and before mounting the anode 22 in the battery, because when the porosity is measured after the anode is mounted in the battery, the electrolyte is penetrated into pores, so an accurate value of the porosity cannot be obtained. For example, when a pressed anode is mounted in the battery, the porosity is measured after pressing the anode and before mounting the anode in the battery.

Moreover, the porosity of the anode mixed layer is a ratio of a volume V1 of the pores of the anode mixed layer to a virtual volume V2 of the anode mixed layer, that is (V1/V2) % 100, and is measured by, for example, mercury porosimetry. The porosity does not include the volume of the anode current collector layer. In general, as described above, the anode mixed layer is applied to the anode current collector layer, so the porosity is measured after removing the anode current collector layer, or the volumes V1 and V2 are measured in a state of including the anode current collector layer, and a volume V3 of pores of the anode current collector layer and a virtual volume V4 of the anode current collector layer are separately measured, then the porosity can be determined by a formula (V1−V3)/(V2−V4) % 100.

The separator 23 may comprise, for example, a porous film made of a microporous polyolefin-based material such as a polyethylene film, a polypropylene film or the like, a porpous film made of an inorganic material such as non-woven fabric made of a ceramic, or a laminate including two or more kinds selected from these porous films. In order to secure the safety of the battery, the material of the separator 23 preferably has a function for blocking the above-described pores at 80° C. to increase resistance, thereby interrupting a current, and a blocking temperature is preferably within a range from 90° C. to 180° C. inclusive.

In the separator 23, a liquid electrolyte is penetrated. The electrolyte is a solvent in which, for example, lithium salt as electrolyte salt is dissolved. As the solvent, a nonaqueous solvent is preferable, and more specifically an organic solvent such as propylene carbonate, ethylene carbonate, diethyl carbonate, methyl ethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propylnitrile, anisole, acetate, propionate or the like is preferable. As the solvent, one kind or a mixture of two or more kinds selected from the nonaqueous solvents is used.

As the lithium salt, for example, $LiClO_4$, $LiAsF_6$, $LiPF_6$, $LiBF_4$, $LiB(C_6H_5)_4$, $LiCH_3SO_3$, $LiCF_3SO_3$, $LiCl$, $LiBr$ or the like is cited, and one kind or a mixture of two or more kinds selected from the group thereof is used.

The secondary battery can be manufactured through the following steps, for example.

At first, the composite oxide described above as the cathode active material and, if necessary, the electronic conductor and the binder are mixed to prepare a cathode mixture, then the cathode mixture is dispersed in a solvent such as N-methyl-2-pyrrolidone or the like to produce a cathode mixture slurry in paste form. After the cathode mixture slurry is applied to the cathode current collector layer, and the solvent is dried, the cathode mixed layer is formed through compression molding by a roller press to form the cathode 21.

Next, for example, the tin-containing alloy powder as the anode active material, a carbon material as the electronic conductor and, if necessary, the binder are mixed to prepare the anode mixture, then the mixture is dispersed in a solvent such as N-methyl-2-pyrrolidone or the like to produce an anode mixture slurry in paste form. After the anode mixture slurry is applied to the anode current collector layer, and the solvent is dried, the anode mixed layer is formed through compression molding by a roller press or the like so as to have a desired porosity, thereby the anode 22 is formed. At this time, the porosity of the anode 22 is adjusted by an adjustment between rolls of the roller press.

Then, the cathode lead 25 is derived from the cathode current collector layer, and the anode lead 26 is derived from the anode current collector layer. After that, for example, a laminate including the cathode 21 and anode 22 with the separator 23 in between is spirally wound to form the spirally wound electrode body 20. After the spirally wound electrode body 20 is formed, an end portion of the cathode lead 25 is welded to the safety valve mechanism 15, and an end portion of the anode lead 26 is welded to the battery can 11. Then, the spirally wound electrode body 20 sandwiched between a pair of insulating plates 12 and 13 is housed in the battery can 11. After the spirally wound electrode body 20 is housed in the battery can 11, the electrolyte (for example, liquid electrolyte) is injected into the battery can 11, and the separator 23 is impregnated with the electrolyte. After that, the battery cover 14, the safety valve mechanism 15 and the PTC device 16 are fixed in an opening end portion of the battery can 11 through caulking by the gasket 17. Thereby, the secondary battery shown in FIG. 1 is formed.

The secondary battery works as follows.

In the secondary battery, when charge is carried out, for example, lithium ions are extracted from the cathode 21, and are inserted into the anode 22 through the electrolyte with which the separator 23 is impregnated. When discharge is carried out, for example, the lithium ions are extracted from the anode 22, and are inserted into the cathode 21 through the electrolyte with which the separator 23 is impregnated. In this case, the porosity of the anode mixed layer before the first charge is within a range from 25 vol % to 65 vol %, so even if the tin-containing alloy powders included in the anode mixed layer expand, enough pores as the lithium ion paths can be secured, thereby the lithium ions can be sufficiently supplied to the anode active material. Therefore, a superior charge-discharge cycle characteristic and a higher capacity retention ratio can be obtained, and even if high-load discharge is carried out, larger discharge energy can be obtained.

Thus, in the secondary battery according to the embodiment, the porosity of the anode mixed layer before the first charge is within a range from 25 vol % to 65 vol %, so in spite of the fact that the tin-containing alloy powders are used as the anode active material, enough pores as the lithium ion paths can be secured. Therefore, a higher discharge capacity and a superior charge-discharge cycle characteristic can be obtained, and even if high-load discharge is carried out under a condition of a 2.5 V high potential cut-off, large discharge energy can be obtained. Therefore, even if the secondary battery according to the embodiment is used in an apparatus comprising a high-density and high-speed integrated circuit, or as a high-power battery for an electric vehicle or the like, sufficient battery characteristics can be obtained.

Further, the secondary battery according to the embodiment can be used in, for example, headphone stereos, video camcorders, liquid crystal display televisions, portable CD players, minidisk players, notebook computers, cellular phones, electric razors, transceivers, electronic organizers, electronic calculators, radios, toys, game machines, clocks, pacemakers or the like. In addition, the secondary battery can be combined with a generator such as solar cell, fuel cell or the like.

EXAMPLES

Moreover, referring to FIG. 1, specific examples of the present invention will be described in detail below.

Examples 1 Through 7

As the tin-containing alloy, a tin-cobalt-zinc (SnCoZn) alloy, a tin-cobalt-iron (SnCoFe) alloy, a tin-iron-chromium-aluminum (SnFeCrAl) alloy and a tin-iron-nickel-copper-molybdenum (SnFeNiCuMo) alloy shown in Table 1 were prepared through the following steps. At first, materials in powder form shown in Table 1 were prepared, and after the materials were weighed so as to have a total mass of 15 g at a compounding ratio (atomic ratio) shown in Table 1, these powders were mechanically alloyed by use of a planetary ball mill in an atmosphere of argon for 60 hours to obtain black powders. At that time, balls and the materials were blended at a mass ratio of 20 to 1, then were sealed in an airtight container. Next, the black powders were put through a sieve with opening of 250 μm to form the tin-containing alloy powders. When the obtained tin-containing alloy powders were observed by a secondary electron microscope, primary particles with a size of approximately 1 μm were secondarily aggregated. Further, when the average size of secondary particles was determined by laser diffraction, results shown in Table 1 were obtained.

TABLE 1

| Anode active material | Atomic composition ratio | Average size of secondary particle (μm) |
| --- | --- | --- |
| SnCoZn alloy | Sn:Co:Zn = 2:2.25:0.75 | 35 |
| SnCoFe alloy | Sn:Co:Fe = 2:1:1 | 25 |
| SnFeCrAl alloy | Sn:Fe:Cr:Al = 2:1.7:0.2:0.2 | 28 |
| SnFeNiCuMo alloy | Sn:Fe:Ni:Cu:Mo = 2:1.4:0.4:0.2:0.2 | 34 |

TABLE 1-continued

| Anode active material | Atomic composition ratio | Average size of secondary particle (μm) |
| --- | --- | --- |
| $SnO_2$ | — | 35 |
| Al | — | 49 |

TABLE 2

| | Anode active material | Porosity of anode mixed layer | Cathode active material | Capacity (mAh) | Cycle capacity retention ratio (%) | Capacity ratio during high-load discharge (%) |
| --- | --- | --- | --- | --- | --- | --- |
| Example 1 | SnCoZn alloy | 31 | $LiNi_{0.5}Co_{0.25}Mn_{0.25}O_2$ | 2290 | 85 | 75 |
| Example 2 | SnCoZn alloy | 42 | $LiNi_{0.5}Co_{0.25}Mn_{0.25}O_2$ | 2100 | 87 | 80 |
| Example 3 | SnCoZn alloy | 59 | $LiNi_{0.5}Co_{0.25}Mn_{0.25}O_2$ | 2010 | 90 | 83 |
| Example 4 | SnCoFe alloy | 31 | $LiCoO_2$ | 2140 | 89 | 85 |
| Example 5 | SnCoFe alloy | 40 | $LiNi_{0.8}Co_{0.19}Al_{0.01}O_2$ | 2200 | 82 | 83 |
| Example 6 | SnFeCrAl alloy | 40 | $LiNi_{0.6}Co_{0.2}Mn_{0.2}O_2$ | 2160 | 87 | 79 |
| Example 7 | SnFeNiCuMo alloy | 40 | $LiNi_{0.8}Co_{0.19}Al_{0.01O2}$ + $LiFePO_4$ | 2110 | 91 | 80 |
| Comparative Example 1 | SnCoZn alloy | 10 | $LiNi_{0.5}Co_{0.25}Mn_{0.25}O_2$ | 2350 | 60 | 55 |
| Comparative Example 2 | SnCoZn alloy | 70 | $LiNi_{0.5}Co_{0.25}Mn_{0.25}O_2$ | 1730 | 86 | 87 |
| Comparative Example 3 | $SnO_2$ | 40 | $LiNi_{0.5}Co_{0.25}Mn_{0.25}O_2$ | 1850 | 51 | 56 |
| Comparative Example 4 | Al | 40 | $LiNi_{0.5}Co_{0.25}Mn_{0.25}O_2$ | 1310 | 45 | 45 |
| Comparative Example 5 | Artificial graphite | 40 | $LiNi_{0.5}Co_{0.25}Mn_{0.25}O_2$ | 1790 | 70 | 81 |

Next, 40 parts by mass of artificial graphite with an average particle size of 10 μm, 5 parts by mass of acetylene black, 10 parts by mass of polyvinylidene fluoride which was the binder, and 45 parts by mass of the tin-containing alloy powders were mixed to prepare the anode mixture, and the mixture was dispersed in N-methyl-2-pyrrolidone which was the solvent to produce the anode mixture slurry. After the anode mixture slurry was produced, the anode mixture slurry was uniformly applied to both sides of the anode current collector layer made of strip-shaped copper foil with a thickness of 15 μm, and was dried. Then, the anode mixed layer was formed through compression molding by the roller press to produce the anode 22. At that time, the porosity was changed as shown in Examples 1 through 7 in Table 2 through adjusting a distance between the rolls of the roller press. Further, the porosity of the anode 22 was determined by a mercury porosimeter after the anode 22 was dried in a vacuum.

Moreover, 91 parts by mass of the cathode active material, 6 parts by mass of graphite which was the electronic conductor, and 3 parts by mass of polyvinylidene fluoride which was the binder were mixed to prepare the cathode mixture, and the mixture was dispersed in N-methyl-2-pyrrolidone which was the solvent to produce the cathode mixture slurry. The cathode mixture slurry was uniformly applied to both sides of the cathode current collector layer made of strip-shaped aluminum foil with a thickness of 20 μm, and was dried. Then, the cathode mixed layer was formed through compression molding by the roller press so as to form the cathode 21. At that time, the cathode active material was changed as shown in Examples 1 through 7 in Table 2. In Example 7, a mass ratio of $LiNi_{0.8}Co_{0.19}Al_{0.01}O_2$ to $LiFePO_4$ was 1:1.

After the cathode 21 and the anode 22 were formed, the cathode lead 25 was derived from a cathode current collector, and the anode lead 26 was derived from an anode current collector, and an insulating tape was stuck on each lead.

Next, the separator 23 made of a microporous polyethylene film with a thickness of 25 μm was prepared, and a laminate including the anode 22, the separator 23, the cathode 21 and the separator 23 in order was spirally wound many times, and an outermost portion thereof was fixed with a tape to form the spirally wound electrode body 20.

After the spirally wound electrode body 20 was formed, the spirally wound electrode body 20 was sandwiched between a pair of insulating plates 12 and 13, and the anode lead 26 was welded to a bottom portion of the battery can 11 made of iron, and the cathode lead 25 was welded to a projected portion of the safety valve mechanism 15. Then, the spirally wound electrode body 20 was housed in the nickel-plated battery can 11. After that, the liquid electrolyte was injected into the battery can 11. As the electrolyte, a mixed solvent containing 50 vol % of ethylene carbonate and 50 vol % of ethyl methyl carbonate in which $LiPF_6$ as the electrolyte salt was dissolved at a ratio of 1 mol/dm³ was used. Finally, the battery cover 14 was caulked into the battery can 11 by the gasket 17 so as to fix the safety valve mechanism 15, the PTC device 16 and the battery cover 14. Thereby, the cylindrical secondary batteries shown in FIG. 1 with an outside diameter of 18 mm and a height of 65 mm according to Examples 1 through 7 were formed.

A charge-discharge cycle test and a load characteristic test were carried out on the obtained secondary batteries. The results are shown in Table 2.

The charge-discharge cycle test was carried out as follows. At first, after the charge was carried out until the battery voltage reached 4.20 V at ambient temperature and a constant current of 1 A, charge was carried out until the total charge time reached 15 hours at a constant voltage of 4.20 V. After that, discharge was carried out until the battery voltage reached 2.5 V at a constant current of 1 A. After the first cycle of charge and discharge was carried out, charge and discharge were carried out in the same manner as the first cycle except that the total charge time was 5 hours, and a charge capacity in the second cycle was determined. Charge and discharge were repeated in the same manner as the second cycle thereafter, and a discharge capacity in the hundredth cycle was determined, then a ratio of the discharge capacity in the hundredth cycle to that in the second cycle (cycle capacity retention ratio) was determined. A formula for determining the ratio was the cycle capacity retention ratio=(the discharge capacity in the hundredth cycle/the discharge capacity in the second cycle) % 100.

Further, the load characteristic test was carried out as follows. At first, two cycles of charge and discharge were carried out at the same conditions as those in the first and the second cycles in the charge-discharge cycle test, and the discharge capacity in the second cycle was determined. Next, after the third cycle of charge was carried out at the same conditions as those in the second cycle, discharge was carried out until the battery voltage reached 2.5 V at a constant current of 4 A, and a discharge capacity during high-load discharge (that is, large-current discharge) was determined. Then, a ratio of the discharge capacity in the third cycle to the discharge capacity in the second cycle was determined. A formula for determining the ratio was the capacity ratio during high-load discharge=(the discharge capacity in the third cycle/the discharge capacity in the second cycle) % 100.

As Comparative Examples 1 and 2 relative to Examples 1 through 3, the secondary batteries were formed as in the case of Examples 1 through 3 except that the porosity was changed as shown in Table 2. Further, as Comparative Examples 3 through 5 relative to Examples 1 through 3, the secondary batteries were formed as in the case of Examples 1 through 3 except that tin oxide ($SnO_2$) with the average size of the secondary particles of 35 µm, aluminum powders with the average particle size of 49 µm or artificial graphite was used, as shown in Table 1. The charge-discharge cycle test and the load characteristic test were carried out on Comparative Examples 1 through 5 in the same manner as Examples 1 through 3, and the capacity, the cycle capacity retention ratio and the capacity ratio during high-load discharge thereof were determined. The results are shown in Table 2.

As can be seen from Table 2, Examples 1 through 7 had a capacity of 2010 mAh or over, a cycle retention ratio of 82% or over and a capacity ratio during high-load discharge of 75% or over, that is, higher values. On the other hand, in Comparative Example 1 in which the porosity was 10%, the cycle capacity retention ratio and the capacity ratio during high-load discharge were as low as 60% and 55%, respectively. In Comparative Example 2 in which the porosity was 70%, the capacity was as low as 1730 mAh. In Comparative Example 3 in which tin oxide was used as the anode active material, the capacity was 1850 mAh, the cycle capacity retention ratio was 51% and the capacity ratio during high-load discharge was 56%, that is, the values were lower.

In Comparative Example 4 in which aluminum powders were used as the anode active material, the capacity was 1310 mAh, the cycle capacity retention ratio was 45% and the capacity ratio during high-load discharge was 45%, that is, the values were extremely low. In Comparative Example 5 in which artificial graphite was used as the anode active material, the capacity was 1790 mAh, and the cycle capacity retention ratio was 70%, that is, the values were lower.

In other words, it was apparent that when the tin-containing alloy powders were used for the anode mixed layer, and the porosity of the anode mixed layer before the first charge was within a range 25 vol % to 65 vol % inclusive, a higher battery capacity could be obtained, and the charge-discharge characteristic and the high-load characteristic could be improved.

In the above Examples, specific kinds of tin-containing alloy are described, but in the above embodiment, as long as any other tin-containing alloy with a porosity within the above range is used, the same result can be obtained.

The present invention is described referring to the embodiment and examples, but the invention is not limited to the above embodiment and examples, and is variously modified. For example, the invention is widely applicable to any battery comprising the anode including the tin-containing alloy powders, and other structures may be different from the above embodiment and examples. More specifically, instead of the liquid electrolyte, any other electrolyte such as a gel electrolyte in which a high polymer holds electrolyte containing lithium salt, a solid electrolyte in which lithium salt is dispersed in a high polymer with ionic conductivity, a solid inorganic conductor or the like may be used.

At this time, for the gel electrolyte, various high polymers which absorb the electrolyte to be gelled can be used. As such a high polymer, for example, a fluoropolymer such as polyvinylidene fluoride or a copolymer of vinylidene fluoride and hexafluoropropylene, an ether-based polymer such as a cross-link including polyethylene oxide or polyethylene oxide, or the like, or polyacrylonitrile is cited. Among them, the fluoropolymer is preferable because it has high stability of oxidation-reduction.

For the solid electrolyte, as the high polymer, for example, an ether-based polymer such as a cross-link including polyethylene oxide or polyethylene oxide, or the like, an ester-based polymer such as polymethacrylate or the like, an acrylate-based polymer, a mixture thereof, or any of the above polymers which is copolymerized can be used. Further, as the inorganic conductor, a polycrystal of lithium nitride, lithium iodide or lithium hydroxide, a mixture of lithium iodide and chromium trioxide, a mixture of lithium iodide, lithium sulfide and phosphorus subsulfide can be used.

Moreover, instead of the cylindrical secondary battery with a spirally-wound structure, the invention may be applied to a secondary battery with any other shape such as a prismatic shape, a coin shape, a button shape, a film shape in which an electrode device is sealed in a laminate film or the like. Further, the invention may be applied to a secondary battery with any other structure such as a structure comprising a laminate including the cathode and the anode with the separator in between. In addition, the invention may be applied to not only the secondary battery but also a primary battery.

As described above, according to the battery of the invention, the porosity of the anode mixed layer before the first charge is within a range from 25 vol % to 65 vol %, so even if the tin-containing alloy powders are used as the anode active material, enough pores as lithium ion paths can be secured. Therefore, a higher capacity can be obtained, and the charge-discharge cycle characteristic and the high load characteristic can be improved.

Obviously many modifications and variations of the present invention are possible in the light of the above teachings. It is therefore to be understood that within the scope of the appended claims the invention may be practiced otherwise than as specifically described.

What is claimed is:

1. A battery comprising:
   a cathode;
   an anode; and
   an electrolyte,
   wherein,
   the anode comprises an anode mixed layer including tin-containing alloy powders,
   the tin-containing alloy powders are made of tin and an element except for alkali metal before first charge,
   said tin containing alloy powders are composed of secondary particles formed by agglomerating primary particles,
   the atomic composition ratio of tin in said tin-containing alloy powders is 40–50% of the alloy powders,
   said tin-containing alloy powders consist essentially of tin and one or more elements selected from the group consisting of aluminum (Al), chromium (Cr), manganese (Mn), iron (Fe), cobalt (Co), nickel (Ni), copper (Cu), zinc (Zn) and molybdenum (Mo),
   at least one of said elements other than tin is present in an amount of at least 10 wt %, and
   a porosity of the anode mixed layer before the first charge is within a range from 25 vol % to 65 vol % inclusive.

2. A battery according to claim 1, wherein the anode mixed layer further includes a carbon material.

3. A battery according to claim 1, wherein the cathode contains a composite oxide including lithium (Li) and at least one kind selected from the group consisting of cobalt, nickel, manganese and iron.

4. A battery according to claim 1, wherein the atomic composition ratio of tin is not more than 49%.

5. A battery according to claim 1, wherein the porosity is not less than 30 vol % and not more than 50 vol %.

6. A battery according to claim 1, wherein the average particle size of said primary particles is within a range from 0.1 μm to 20 μm, inclusive, and the average particle size of said secondary particles is within a range from 10 μm to 40 μm, inclusive.

* * * * *